(12) United States Patent
Duron et al.

(10) Patent No.: US 8,077,763 B2
(45) Date of Patent: Dec. 13, 2011

(54) FULL-DUPLEX RADIO FREQUENCY ECHO CANCELLATION

(75) Inventors: Mark Duron, East Patchogue, NY (US); Raj Bridgelall, Mount Sinai, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1067 days.

(21) Appl. No.: 10/690,390

(22) Filed: Oct. 21, 2003

(65) Prior Publication Data

US 2005/0084003 A1    Apr. 21, 2005

(51) Int. Cl.
    *H04B 1/38* (2006.01)
(52) U.S. Cl. ...................................................... 375/221
(58) Field of Classification Search .................. 375/220, 375/222, 224, 219, 285; 370/282, 283, 284, 370/286, 287, 289, 290, 291, 292, 293; 379/3, 379/406.01, 406.12, 416
See application file for complete search history.

(56) References Cited

U.S. PATENT DOCUMENTS

| 4,074,086 | A | * | 2/1978 | Falconer et al. | 379/406.08 |
| 4,355,214 | A | * | 10/1982 | Levy et al. | 370/291 |
| 6,236,315 | B1 | * | 5/2001 | Helms et al. | 340/572.7 |

FOREIGN PATENT DOCUMENTS

| JP | 06260587 | 5/1996 |
| WO | WO0021204 A | 4/2000 |
| WO | WO0052838 A | 9/2000 |

OTHER PUBLICATIONS

EPC Supplementary European Search Report Dated Nov. 5, 2009.
Japanese Office Action Dated Jun. 21, 2010.
Supplementary EPO Search Report dated Nov. 5, 2009.

* cited by examiner

*Primary Examiner* — Chieh M Fan
*Assistant Examiner* — Jaison Joseph
(74) *Attorney, Agent, or Firm* — Glenn Frankenberger; Terri S. Hughes

(57) ABSTRACT

A system comprising a transmitter element creating an interrogation signal and transmitting the interrogation signal and a receiver element receiving a reflection signal of the interrogation signal and combining the reflection signal and a feedback signal to cancel at least a portion of radio frequency echo signals in the reflection signal.

16 Claims, 4 Drawing Sheets

FULL-DUPLEX RADIO FREQUENCY ECHO CANCELLATION

BACKGROUND

Radio frequency identification ("RFID") systems are used in a plethora of commercial contexts requiring a unique identification system for large numbers of items. Such contexts include everything from department store inventory and check-out systems to the tracking of military supplies to and from the front lines. Similar in utility to bar code technology, RFID systems are often preferred due to their increased range, lack of a line of sight requirement between a tag and its reader and the high multi-tag throughput of RFID readers (i.e., RFID readers may read many tags in their large field of view at very high transport speeds).

A problem that arises is that optimal performance of RFID systems is often hampered by the reflection and coupling which inevitably occur in RF transceivers, in which a significant portion of the transmitted interrogation signal is reflected by the antenna and objects in the environment into the receiving portion of the transceiver. These problems are quantified in a measure called the voltage standing wave ratio ("VSWR"), measured as the non-transmitted (i.e. coupled or reflected from the antenna or non-RFID objects in the environment) power over the total transmitted power of the transceiver. A high VSWR interferes with efficient transceiver performance and may even result in a "blinding" or complete saturation of the receiver. Transceivers designed to minimize VSWR are often unacceptable because of their high cost in terms of size and power, especially in the context of mobile devices.

SUMMARY OF THE INVENTION

A system comprising a transmitter element creating an interrogation signal and transmitting the interrogation signal and a receiver element receiving a reflection signal of the interrogation signal and combining the reflection signal and a feedback signal to cancel at least a portion of radio frequency echo signals in the reflection signal.

A method, comprising the steps of receiving a reflection signal, deriving a feedback signal from the reflection signal by isolating an error component of the reflection signal and combining the reflection signal and the feedback signal to cancel at least a portion of radio frequency echo signals in the reflection signal.

Furthermore, a method comprising the steps of demodulating a reflection signal into an in-phase signal and a quadrature signal, filtering the in-phase signal to isolate an in-phase error signal, filtering the quadrature signal to isolate a quadrature error signal, modulating the in-phase error signal and the quadrature error signal to create a feedback signal and combining the reflection signal and the feedback signal to cancel at least a portion of radio frequency echo signals in the reflection signal.

In addition, a system, comprising a demodulator to demodulate a reflection signal into an in-phase signal and a quadrature signal, a first filter to isolate an in-phase error signal from the in-phase signal, a second filter to isolate a quadrature error signal from the quadrature signal, a modulator to modulate the in-phase error signal and the quadrature error signal to create a feedback signal and a combiner element to combine the reflection signal and the feedback signal to cancel at least a portion of radio frequency echo signals in the reflection signal.

DETAILED DESCRIPTION

Figure 1:
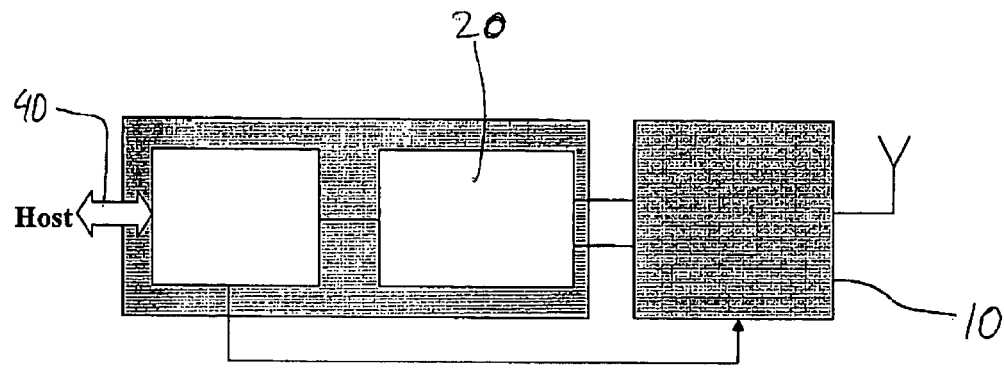
FIG. 1 shows the basic components of a conventional RFID system and their locations with respect to one another within such a system.

FIG. 1 illustrates the basic components of an RFID system 1, in which RF "tags" located on objects in the environment may reflect radio waves originating from a transceiver 10 in a pre-determined bit pattern and data rate via the principle of backscatter radiation. These reflections may be received by the transceiver 10, stripped of their carrier signal and converted into in-phase ("I") and quadrature ("Q") components. These components may then be independently digitized and sent to a base-band processor 20 for bit decoding. This decoded information may then be sent on to a reader control 30 which may perform such processes as error correction, command interpretation, and management of access to the RF channel. A host interface 40 performs filtering operations and translation of the results of the reader control 30 into a format intelligible to the host, and likewise translates host requests into a format intelligible to the reader control 30.

Figure 2:
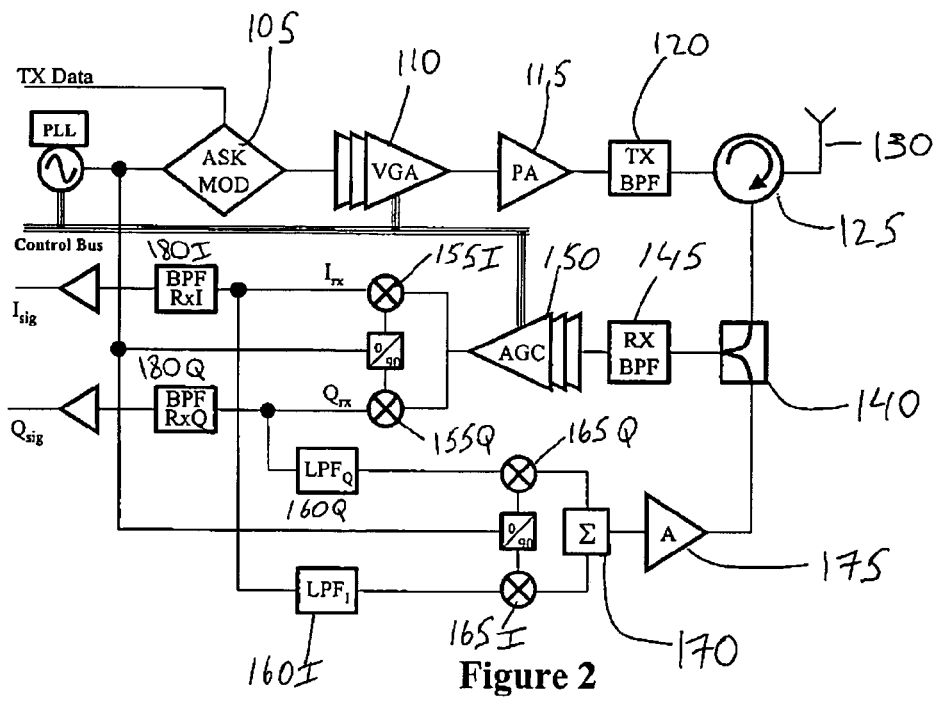
FIG. 2 shows an exemplary embodiment according to the present invention of a feedback loop inserted into the transceiver component of an RFID system enabling VSWR error signal cancellation.

FIG. 2 shows an exemplary embodiment of a transceiver component of an RFID system according to the present invention. The exemplary tranceiver component includes a feedback loop which serves to minimize the effects of reflection and coupling on the incoming signal, and resulting in a lower transceiver VSWR.

The transmitter portion of an RFID transceiver may create an interrogation signal for transmission by using a modulator 105 and a variable gain amplifier ("VGA") 110 to modulate a carrier signal. Use of the VGA 110 may result in an amplitude modulated (AM) carrier wave. This modulated carrier wave may then be sent to a power amplifier 115 and band-pass filter 120. This amplified and filtered modulated carrier wave may then be sent to a circulator or coupler element 125 for transmission to the antenna 130.

This transmitted interrogation signal may then reflect off of an RF tag which has been attached to or associated with a piece of equipment or other commodity. These reflections, which carry information to identify the tag, may be received by the antenna 130. In an ideal RFID tranceiver, these received reflections constitute the whole of the signal received by the antenna 130. However, in deployed RFID systems, the received signal also contains an error component comprised of interrogation signal energy which has been coupled from the transmitter, reflected from the antenna 130, and reflected from objects in the environment other than the RF tag.

The incoming signal may arrive at the antenna 130 containing both valuable information from an RF tag and an error signal. In the exemplary embodiment of the present invention, this composite signal may be sent through a circulator 125 which may route the incoming signal into one input of an RF combiner 140. The combiner 140 may add this incoming signal to the output of the feedback circuit discussed below, and may feed the sum of these two signals into a band-pass filter 145. The band-pass filter 145 removes signal components outside of the frequency range of the modulated data signal of interest.

The signal may then be amplified by an automatic gain control ("AGC") 150. This amplified signal may then be carrier-demodulated in quadrature using a demodulator 155. Both of the resulting demodulated signals (the in-phase signal Irx and the quadrature signal Qrx) may then be split. Two separate branches may take the in-phase and quadrature signals through band-pass filters 180I and 180Q before continuing towards the transceiver output for further processing by the base-band decoder 20.

Each of these branches includes a second path as input for a feedback loop. The feedback loop achieves echo cancellation in the transceiver by isolating the noise (error) component of the incoming signal using low-pass filters 160I and 160Q, subjecting this signal to a phase inversion, and then combining it with the incoming signal using another input of the RF combiner 140. The required phase inversion may be accomplished by modulating the physical path length of the return loop. For example, the path length may be controlled by either controlling the microwave traces on the circuit board at the design phase, or by adding a variable delay element for adaptive control. The feedback loop may be designed to converge with the incoming signal within the impulse response time of the low-pass filter, which is usually within a few cycles of the carrier signal.

After beginning the feedback loop, both the in-phase signal Irx and the quadrature signal Qrx may first be passed through low-pass filters 160I and 160Q. These low-pass filters may isolate the undesirable echo signal since the majority of the base band error signal is of a lower frequency than the signal of interest. In this example, the error signal is of a lower frequency and therefore low pass filters are used. However, there may be other implementations where the error signal is in a defined range of frequencies and a band-pass filter may be used or where the error signal is a higher frequency signal and a high pass filter is used. The outputs of these low-pass filters 160I and 160Q may then be modulated using modulator 165. The two signals may then be combined using a summing element 170. The resulting signal may then be passed through feedback amplifier 175 and the amplified signal may be fed into another input of RF combiner 140. This closes the feedback loop. The feedback signal may combine with the incoming signal in a manner which cancels out the noise component of the incoming signal, leaving only the modulated data reflected from the RF tag.

Figure 3:
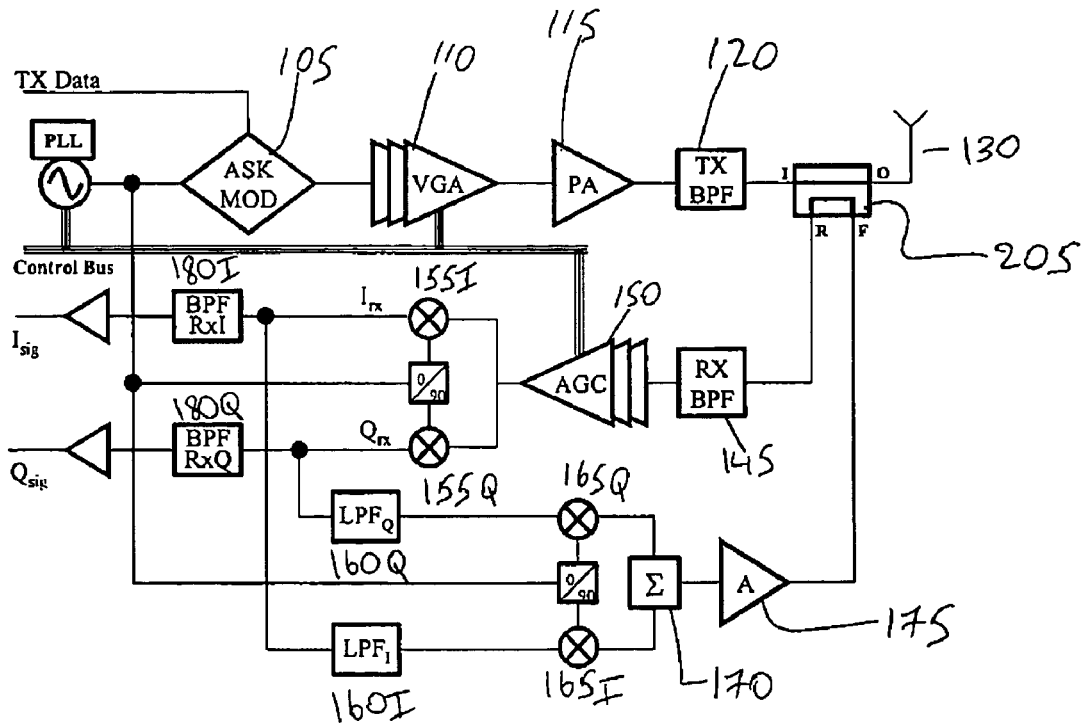
FIG. 3 shows an alternative embodiment of the present invention substituting a 4-way directional coupler for the circulator element and RF splitter shown in FIG. 1.

FIG. 3 shows an alternative exemplary embodiment of the present invention. This embodiment may achieve similar results using a lower number of overall elements by replacing the circulator element 125 and the RF splitter 140 depicted in FIG. 2 with a 4-way directional coupler 205. The interrogation signal is synthesized in this embodiment in the same manner described for FIG. 2 above. The incoming signal from the antenna 130 may be sent into one port of the coupler 205 which in turn may pass this incoming signal to output port R of the coupler 205. The signal path from that point is the same as that described in FIG. 2 above, beginning with the receiver band-pass filter 145.

The exemplary embodiment of the present invention shown in FIG. 3 may be more cost-effective than that shown in FIG. 2, either by reducing the number of components in the transceiver or by substituting less expensive yet equally effective components for more expensive ones. However, this arrangement may introduce other problems such as non-linearity and amplification of harmonics. The non-linearity may be controlled by recording it digitally and then adding a correction factor into the feedback loop. Amplified harmonics may be controlled by adding a low-pass filter (not shown) to the output of the feedback amplifier 175.

Figure 4:
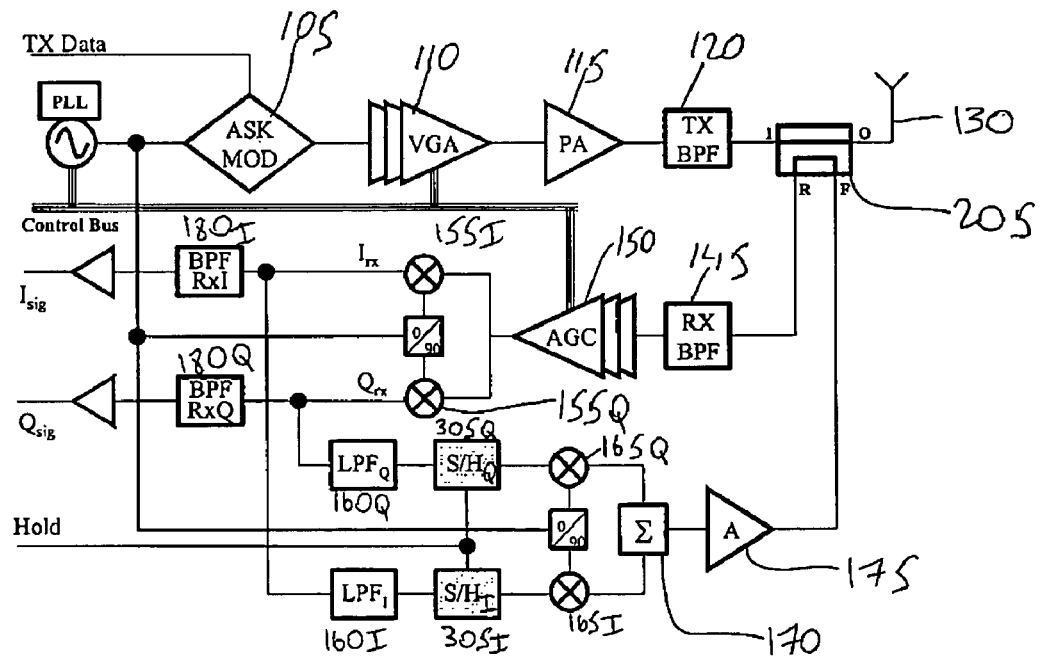
FIG. 4 shows an alternative embodiment of the present invention with non-linear error rejection used for RF echo cancellation.

FIG. 4 shows a second alternative exemplary embodiment of the present invention with a sample and hold circuit 305 inserted into the feedback loop. Both the outgoing and incoming signal paths are the same in this embodiment as those described in FIGS. 2 and 3 above; in addition, however, the sample and hold circuit 305 (shown as sample and hold components 305I and 305Q) may be inserted in the feedback loop in between the low-pass filters 160I and 160Q. The sample and hold circuit 305 may cancel the static reflection components of the received signal by activating its hold mode when the transceiver is receiving a backscatter signal. While the sample and hold circuit 305 may not cancel noise components caused by slow movements in the environment, the effects of these movements may be minimized due to the long duration of such reflection changes relative to the hold periods of the circuit. The sample and hold circuit 305 may also result in an overall reduction in noise caused by coupling between the In-phase (Irx) and Quadrature (Qrx) components of the received signal.

Figure 5:
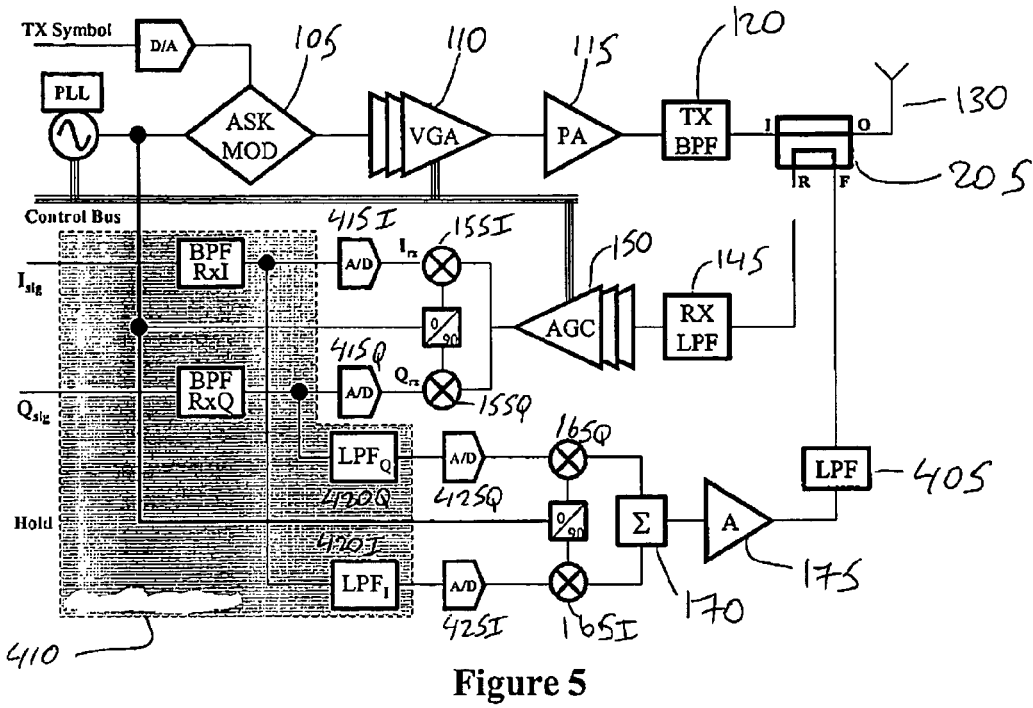
FIG. 5 shows an alternative embodiment of the present invention employing digital signal filtering in the feedback loop rather than analog filtering.

FIG. 5 shows a third alternative exemplary embodiment of the present invention using a base-band digital radio 410 to accomplish the filtering portion of the feedback loop digitally. Here, the demodulated In-phase (Irx) and Quadrature (Qrx) components of the received signal may be converted into digital signals using analog-to-digital converters 415I and 415Q. The output signal path from the transceiver 10 to the base band processor 20 is the same as in the previous embodiments, except that the low-pass filters 420I and 420Q are implemented as digital components in the base band digital radio 410.

In the feedback portion of the signal path, these digital signals may then be filtered using digital low-pass filters 420I and 420Q contained in the base-band digital radio 410. The output of these filters may then be converted back into analog signals using digital-to-analog converters 425I and 425Q. These converters may inherently perform the echo cancellation performed by the sample-and-hold circuit 305 in FIG. 4. Thus, the inclusion of the base band digital radio 410 in this exemplary embodiment obviates the need for a sample-and-hold circuit of the kind presented in FIG. 4.

Figure 6:
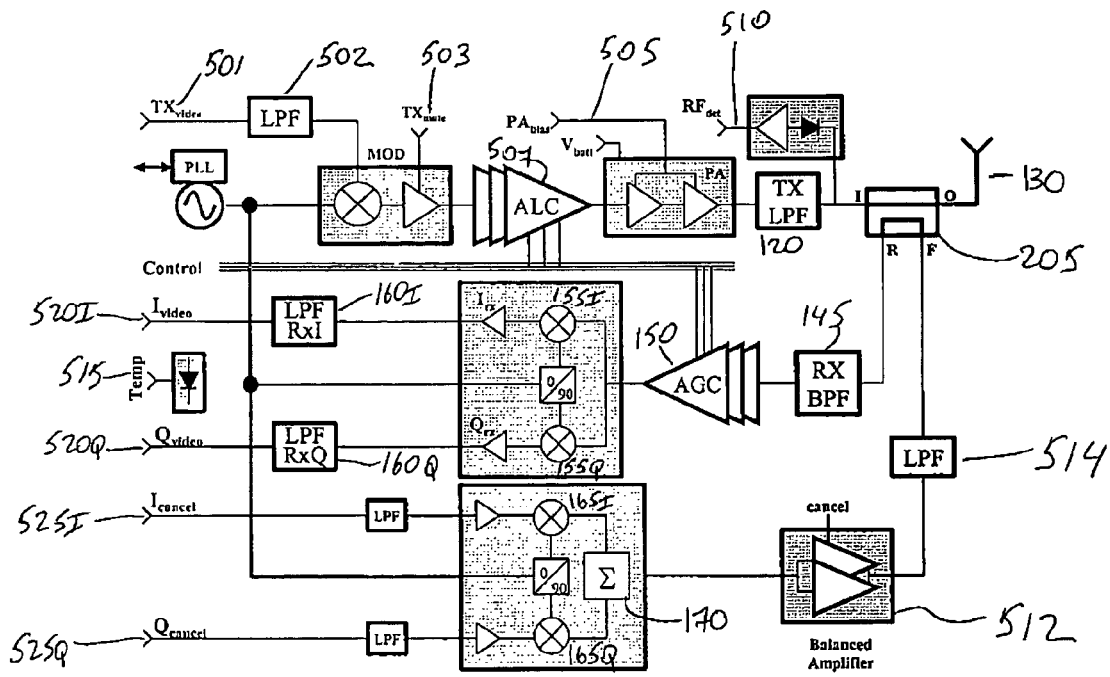
FIG. 6 shows the preferred embodiment of the present invention.

FIG. 6 shows a fourth exemplary embodiment of the present invention. This exemplary embodiment creates the outgoing interrogation signal in a manner identical to the previous embodiments, except that a power amplifier biasing element 505 and a power output detector 510 are added to allow for precise digital control of output power. A temperature monitor 515 may also be included to prevent overheating. This embodiment also includes a Tx video 501 input which is an analog signal generated by a D/A converter. The Tx video 501 input is the analog equivalent of the Tx Symbol input referred to in FIG. 5. The Tx Mute 503 input allows the transmitter to be turned off and is independent of the receiver, i.e., the receiver may be listening to other transmissions while the transmitter is shut-off. The ALC (automatic level control) 507 performs the same function as the VGA 110 described with reference to the previous embodiments.

In the present exemplary embodiment the incoming signal may again be passed through a band-pass filter 145 and an AGC element 150. The signal may then be demodulated in-phase and in-quadrature using demodulators 155I and 155Q. The resulting base band signals may be passed through low-pass filters 160I and 160Q. The low pass filters 160I and 160Q are anti-aliasing filters for the D/A converters. This exemplary embodiment may utilize the digital sub-system (shown in detail in FIG. 7) to perform other functions. For example, digital filtering of the Irx and Qrx video signals 520I and 520Q in order to drive the feedback path and to enable real-time adaptation of the system depending on the multi-path signal propagation conditions.

The RF echo cancellation low pass filters may be digitally implemented in the baseband portion of the system. The multi-path signal propagation conditions change the nature of the echo signals from non-RFID elements that may be moving around in the environment. Thus, a digitally implemented adaptive filter may be advantageous. The inputs for adaptation may be a calibration period that sends out a known signal while obtaining reflections from known tags. For example, a known tag may be affixed to a known location on the wall near a docking bay portal. The digital system may also continuously re-calibrate the feedback loop by monitoring the video signals 520I and 520Q for imbalances. When such imbalances are detected the digital system may compute gain, phase, and offset correction factors, and then apply these factors to the feedback loop using Icancel and Qcancel signals 525I and 525Q.

The embodiment of FIG. 6 also shows a balanced amplifier 512 in the feedback loop. The balanced amplifier may operate in the same manner as the amplifier 175 described with reference to the previous embodiments. However, the balance amplifier 512 may be used for impedance matching to the low pass filter 514. It should be understood that the low pass filter 514 is optional and does not need to be included in the feedback loop of this embodiment. In the event that the low pass filter 514 is not included, the balanced amplifier 512 may still be used to match impedance to the coupler 205 to reduce non-linearities.

Figure 7:
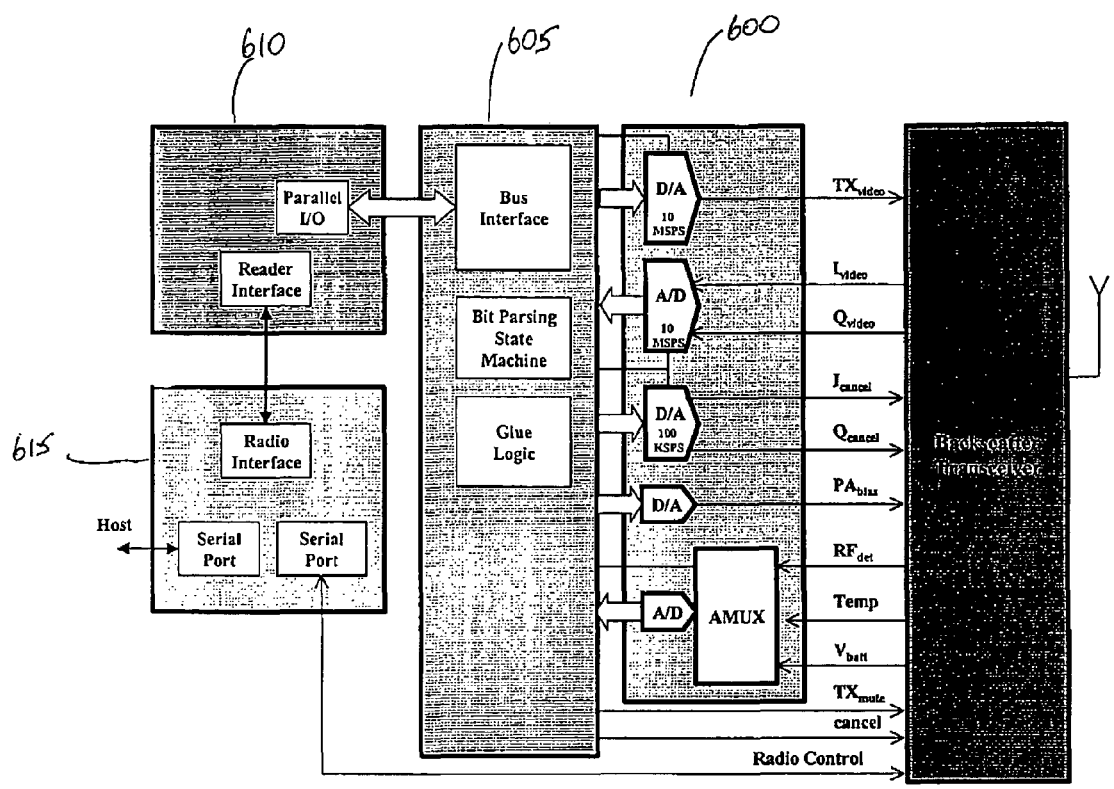
FIG. 7 shows the sub-system interfaces through which the transceiver described using the present invention may interact with other components of an RFID system.

FIG. 7 shows the sub-system interfaces through which the transceiver described by the present invention may interact with other components of an RFID system 1. A data conversion block 600 may provide a simple analog signal interface with digital controls. A programmable logic device 605 may provide a parallel interface to a digital signal processor 610. An MCU 615 may provide additional user controls and interfaces with the transceiver and other components. The MCU 615 may provide the protocol for the communications between the reader and the tag including multi-tag arbitration. Such protocols may include those published by the UCC (Uniform Code Council), EAN (European Article Numbering), and ISO (International Standards Organization). The MCU 615 may also provide packet data synthesis for conversion to a bit stream that may be bit encoded, modulated and transmitted by the transceiver, provide frequency hopping and channel access protocols, provide automatic gain control for a maximum signal to noise ratio and dynamic range of the received signal and provide automatic level control for transmission power control for power savings, interference mitigation, user selectable power profiling, and any applications where power control is advantageous.

It will be apparent to those skilled in the art that various modifications and variations can be made in the structure and the methodology of the present invention, without departing from the spirit or scope of the invention. Thus, it is intended that the present invention cover the modifications and variations of this invention provided they come within the scope of the appended claims and their equivalents.

What is claimed is:

1. A system, comprising:
 a transmitter element creating an interrogation signal and transmitting the interrogation signal; and
 a receiver element receiving and demodulating a reflection signal of the interrogation signal and combining the reflection signal and a feedback signal to cancel at least a portion of radio frequency echo signals in the reflection signal, wherein the reflection signal comprises an error component comprising interrogation signal energy reflected from objects in an environment other than a radio frequency tag, and wherein the feedback signal comprises the at least a portion of radio frequency echo signals comprising the error component at lower frequencies than a data signal of interest;
 wherein the feedback signal is derived by isolating the error component of the reflection signal, and wherein the error component of the reflection signal is isolated by low pass filtering the reflection signal.

2. The system according to claim 1, wherein the error component of the reflection signal is isolated in one of an in-phase signal and a quadrature signal.

3. The system according to claim 1, wherein the feedback signal is combined with the reflection signal within an impulse response time of a filtering element which is filtering the reflection signal.

4. The system according to claim 1, wherein the reflection signal is reflected by the radio frequency tag and other objects in the environment other than the radio frequency tag.

5. The system according to claim 1, wherein the feedback signal is derived through one of analog processing and digital processing.

6. A method, comprising the steps of:
 demodulating a reflection signal into an in-phase signal and a quadrature signal;
 low pass filtering the in-phase signal to isolate an in-phase error signal;
 low pass filtering the quadrature signal to isolate a quadrature error signal;
 modulating the in-phase error signal and the quadrature error signal to create an in-phase feedback signal and a quadrature feedback signal;
 combining the in-phase signal with the in-phase feedback signal and the quadrature signal with the quadrature feedback signal to cancel at least a portion of radio frequency echo signals in the reflection signal; and
 band pass filtering each of the combined in-phase signal and in-phase feedback signal and the combined quadrature signal and quadrature feedback signal.

7. The method according to claim 6, wherein the filtering steps comprises isolating a base band error signal at a lower frequency than a data signal of interest.

8. The method according to claim 6, further comprising the step of:
 amplifying the feedback signal prior to the combining step.

9. The method according to claim 6, further comprising the steps of:
 converting the in-phase signal and the quadrature signal from an analog signal to a digital signal; and
 converting the in-phase error signal and the quadrature error signal from a digital signal to an analog signal.

10. A system, comprising:
a demodulator to demodulate a reflection signal into an in-phase signal and a quadrature signal;
a first low pass filter to isolate an in-phase error signal from the in-phase signal;
a second low pass filter to isolate a quadrature error signal from the quadrature signal;
a modulator to modulate the in-phase error signal and the quadrature error signal to create a feedback signal;
a combiner element to combine the in-phase signal with the in-phase feedback signal and the quadrature signal with the quadrature feedback signal to cancel at least a portion of radio frequency echo signals in the reflection signal;
a first band pass filter to band pass filter the combined in-phase signal and in-phase feedback signal; and
a second band pass filter to band pass filter the combined quadrature signal and quadrature feedback signal.

11. The system according to claim 10, wherein the first and second filters are configured to isolate a base band error signal at a lower frequency than a data signal of interest.

12. The system according to claim 10, wherein the combiner element is one of a radio frequency splitter and a directional coupler.

13. The system according to claim 10, further comprising:
an amplifier to amplify the feedback signal before input into the combiner element.

14. A system comprising:
a demodulator to demodulate a reflection signal into an in-phase signal and a quadrature signal;
a first filter to isolate an in-phase error signal from the in-phase signal;
a second filter to isolate a quadrature error signal from the quadrature signal;
a modulator to modulate the in-phase error signal and the quadrature error signal to create a feedback signal;
a combiner element to combine the reflection signal and the feedback signal to cancel at least a portion of radio frequency echo signals in the reflection signal; and
a sample and hold element that activates a hold mode when a reflection signal is receiving a backscatter signal.

15. The system according to claim 10, further comprising:
a third filter to filter the feedback signal before input into the combiner element.

16. The system according to claim 1, further comprising:
a single antenna connected to the transmitter element and the receiver element.

\* \* \* \* \*

UNITED STATES PATENT AND TRADEMARK OFFICE
CERTIFICATE OF CORRECTION

PATENT NO.         : 8,077,763 B2                           Page 1 of 1
APPLICATION NO.    : 10/690390
DATED              : December 13, 2011
INVENTOR(S)        : Duron et al.

It is certified that error appears in the above-identified patent and that said Letters Patent is hereby corrected as shown below:

In Column 2, Line 46, delete "tranceiver" and insert -- transceiver --, therefor.

In Column 2, Line 63, delete "tranceiver," and insert -- transceiver, --, therefor.

In Column 4, Line 21, delete "3051" and insert -- 305I --, therefor.

In Column 6, Line 34, in Claim 4, delete "frequency" and insert -- frequency identification --, therefor.

In Column 6, Line 35, in Claim 4, delete "frequency" and insert -- frequency identification --, therefor.

Signed and Sealed this
Eleventh Day of December, 2012

David J. Kappos
*Director of the United States Patent and Trademark Office*